(12) United States Patent
Dunne et al.

(10) Patent No.: US 6,710,250 B2
(45) Date of Patent: Mar. 23, 2004

(54) CONDUITS

(75) Inventors: Donal Joseph Dunne, Clogh Road, Castlecomer, County Kilkenny (IE); Patrick Joseph Reidy, 86 Monaleen Park, Castletroy, Limerick, County Limerick (IE); John Anthony Hennessy, Kilkenny (IE)

(73) Assignees: Donal Joseph Dunne, Castlecomer (IE); Patrick Joseph Reidy, Castletroy (IE)

( * ) Notice: Subject to any disclaimer, the term of this patent is extended or adjusted under 35 U.S.C. 154(b) by 0 days.

(21) Appl. No.: 10/274,260

(22) Filed: Oct. 21, 2002

(65) Prior Publication Data

US 2003/0042037 A1 Mar. 6, 2003

Related U.S. Application Data

(62) Division of application No. 09/945,836, filed on Sep. 5, 2001, now Pat. No. 6,476,322.

(51) Int. Cl.[7] .................................................. H01B 3/14
(52) U.S. Cl. ........................ 174/68.1; 174/68.3; 174/95; 138/156; 248/49
(58) Field of Search .............................. 174/68.1, 68.3, 174/101, 70 R, 99 R, 48, 95, 19, 64; 138/156; 248/49, 68.1; 52/39

(56) References Cited

U.S. PATENT DOCUMENTS

| | | | | |
|---|---|---|---|---|
| 3,710,911 A | * | 1/1973 | Eidelberg et al. | 174/65 R |
| 3,891,294 A | * | 6/1975 | Philibert | 174/65 R |
| 3,893,719 A | * | 7/1975 | Eidelberg et al. | 174/65 R |
| 3,958,818 A | * | 5/1976 | Mason | 174/65 R |
| 4,374,596 A | | 2/1983 | Schlemmer et al. | 285/305 |
| 4,377,291 A | | 3/1983 | Albertini | 277/105 |
| 4,496,792 A | * | 1/1985 | Balkwill et al. | 174/65 R |
| 4,647,074 A | | 3/1987 | Pate et al. | 285/64 |
| 5,259,418 A | * | 11/1993 | Hamrick | 116/207 |
| 6,034,325 A | * | 3/2000 | Nattel et al. | 174/59 |

* cited by examiner

Primary Examiner—Dhiru R Patel
(74) Attorney, Agent, or Firm—Jacobson Holman PLLC

(57) ABSTRACT

Steel trunking is provided for housing transmission cables particularly in areas where hygiene and sterility is important. The invention provides lengths of hollow conduit which are secured together by push-on connectors in the form of sleeves. There is also provided a transmission cable outlet device 20 comprising a hollow body member terminating in an end plate 33. The end plate 33 carries glands 34 which grip and hold cables so as to provide a clean and efficient take-off from the trunking.

28 Claims, 8 Drawing Sheets

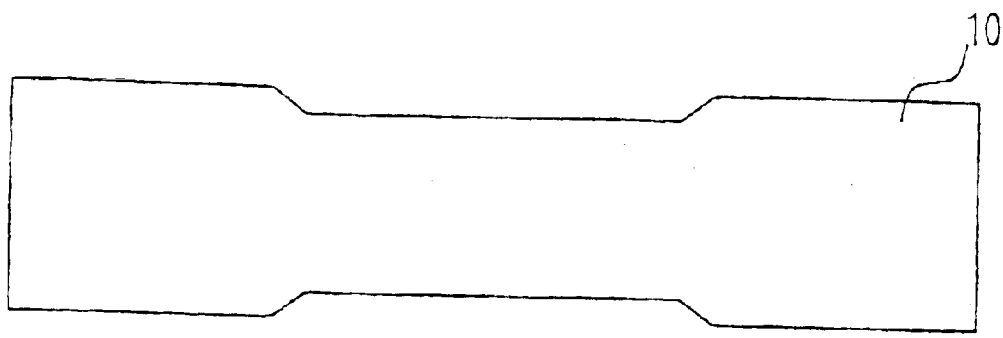
(a)
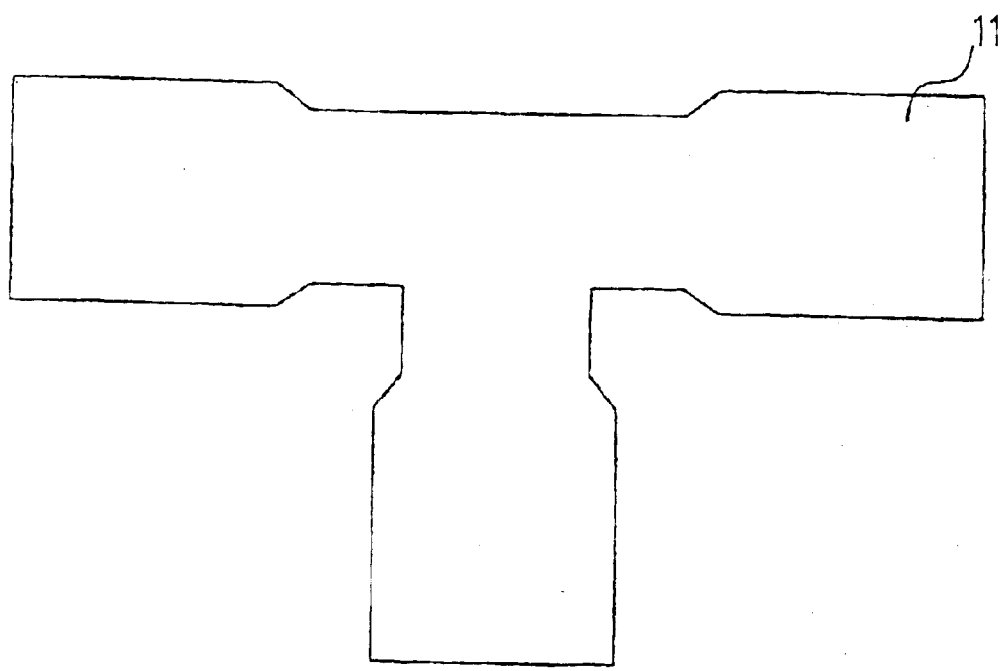
(b)
Fig 2

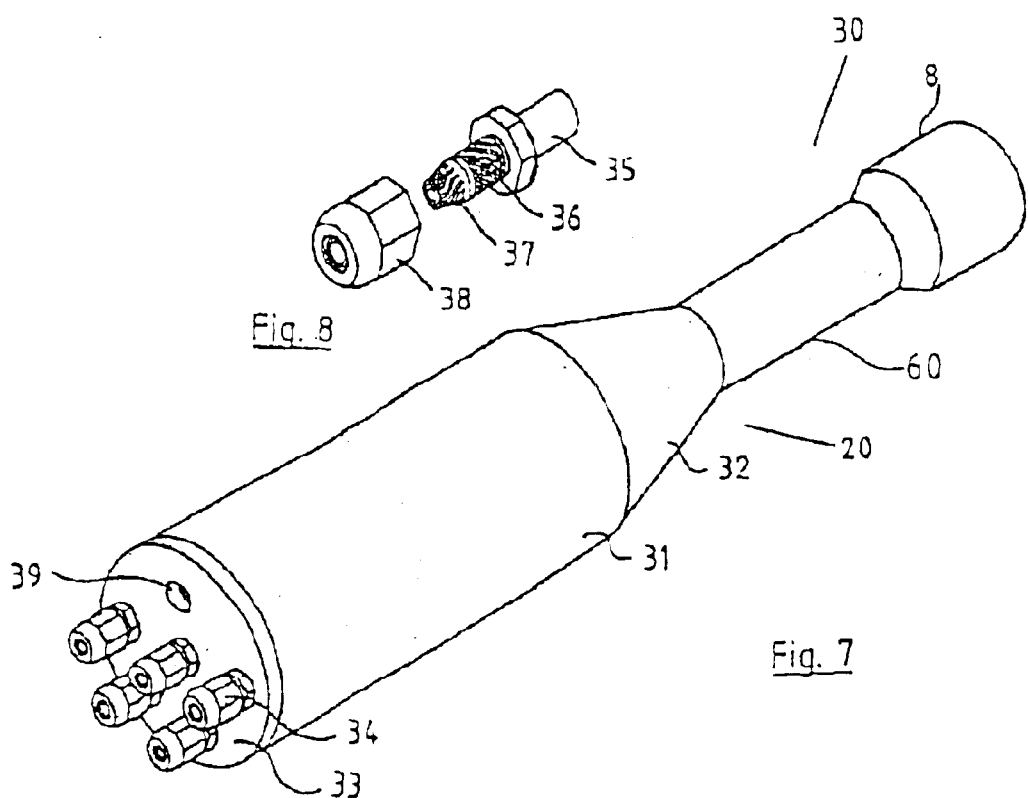

CONDUITS

This is a Division application of Ser. No. 09/945,836 Filed Sep. 5, 2001, Now U.S. Pat. No. 6,476,322.

INTRODUCTION

The present invention relates to a construction of trunking. Trunking is used extensively to house electrical cable, fibre optic cables, air lines and general flexible carriers of fluids, electrical and other signals, hereinafter referred to generally as cables. It may be large or it may be relatively small in the form of circular cable ducting.

1. Field of the Invention

A problem with trunking is that very often conduits, which can be circular, are used to take off cabling from larger trunking or simply to bring cabling around factories. These conduits are often circular pipes which may be connected to channel shaped conduits, or indeed to other larger pipes. There are various problems then when fluid lines such as air lines or electric cable is taken off from the conduit, for example, to feed switchgear, motors and the like, or indeed in the transfer from one conduit to another.

A further problem is that the end face of the conduit is usually exposed such as to allow the ingress of dirt, moisture, and the like and this is, generally speaking, unhygienic. These also often have sharp edges leading to cable damage. Also, it is important to prevent the entry of rodents and insects.

2. Description of Prior Art

It is known, for example, to provide an electrical duct connector which has a pipe form of essentially the same cross sectional geometry as duct ends to be connected thereby. The duct connector has an outer wall diameter corresponding to the inner diameter of the duct ends so that the connector fits snugly into the duct ends. Such a connector is shown in U.S. Pat. No. 4,374,596 (Schlemmer et al). However, this is a relatively complex construction and involves a two part construction of pipe connector which is relatively inefficient. There are also proposed various devices for sealing the ends of electrical conduits such as that shown in U.S. Pat. No. 4,496,792 (Balkwell et al). Thus, the problems are already well known in the prior art and various solutions have been proposed. However, what is required is a simple and effective way of providing such trunking.

There is a need for a more hygienic way of leading electrical cable, fluid feed lines hereinafter referred to generally as transmission cables and the like, from such conduits to the positions in which they are required for the operation of the particular installation.

Further, and very importantly, there is a need to join such conduits together in such a manner as to provide a smooth transition between conduits without damage to other service carrying units that may be mounted therein. This is particularly important with electric power cables.

OBJECTS OF THE INVENTION

The present invention is directed towards overcoming the problems inherent in the present construction of trunking and in particular with the aforementioned trunking in the form of enclosed usually circular conduits. The term "conduit" is used in this specification to include all forms of conduit such as circular or rectangular pipes, sectioned pipes and fabricated trunking. While the description relates entirely to circular pipes, it will be easily appreciated how other types of conduit could use the present invention.

SUMMARY OF THE INVENTION

The invention provides a steel trunking assembly for housing transmission cables whether they be electric cables, air lines, fibre optic cables or indeed any cables that are flexible carriers of fluids, electrical and other signals. It is for lengths of steel conduit circular in cross-section having exposed end faces which are connected together by bored connectors. Each connector comprises at least two connector inlets, each for reception of the free end of a conduit. They can, for example, be T-pieces or multiple connectors. Each connector inlet has a conduit receiving bore extending from an open conduit receiving mouth to an internal conduit restraining stop. The conduit fits as a snug fit but not necessarily a tight fit within the bore. The invention provides a bored sleeve of plastics material which forms a force-fit within the conduit and the sleeve has a stop engaging annular flange projecting across the exposed end face of the conduit to engage against the internal conduit restraining stop. The sleeve effectively forms, firstly, the actual force-fit connector between the conduit and the connector and secondly, a smooth transition between connector and conduit for any transmission cables. The flange can extend laterally beyond the exterior of the conduit to form the force-fit and is ideally formed of a resilient plastics material.

A particularly suitable conduit restraining stop is formed by a gradual reduction in diameter of the conduit receiving bore where it connects with the remainder of the bore of the connector. With this latter embodiment, the sleeve has an outer stop facing surface to mirror the shape of the bore of the connector where its diameter is reduced to form the conduit restraining stop and in this way, the sleeve can form again a force-fit over the whole length of the stop.

The sleeve may have an enlarged tapering bore adjacent the flange to provide a smooth transition between the exterior of the flange and the conduit. Additionally, the tapering may occur adjacent each end of the bore.

In one embodiment of the invention, the steel trunking assembly has a transmission cable outlet device for the trunking comprising a hollow body member, an endplate incorporating a plurality of exit holes and a cable embracing connector in each exit hole. By having a tight cable embracing connector on each exit hole, it is possible to prevent the ingress of moisture and foreign bodies such as dust or rodents and insects. Such a transmission cable and outlet device will contain at least one of the conduit connectors already described as integral therewith for securing to a length of conduit.

A further embodiment of the invention provides a steel trunking cable where, instead of having the conduit engaging within the connector, the connector engages within the conduit. In this case, the sleeve will be mounted on the connector which will comprise at least two cylindrical connector spigots, each for engagement in the end of a conduit. Then, each connector spigot will have, on its outer surface, a conduit restraining stop. Further, such a steel trunking assembly may also include a transmission cable outlet device according to the invention.

BRIEF DESCRIPTION OF THE DRAWINGS

The invention will be more clearly understood from the following description of an embodiment thereof, given by way of example only, with reference to the accompanying drawings, in which:

FIGS. 2(a) and (b) are front views of connectors according to the invention;

FIG. 7 is a perspective view of a transmission cable outlet device according to the invention;

FIG. 8 is an exploded view of portion of the cable outlet device of FIG. 7;

Figure 1:
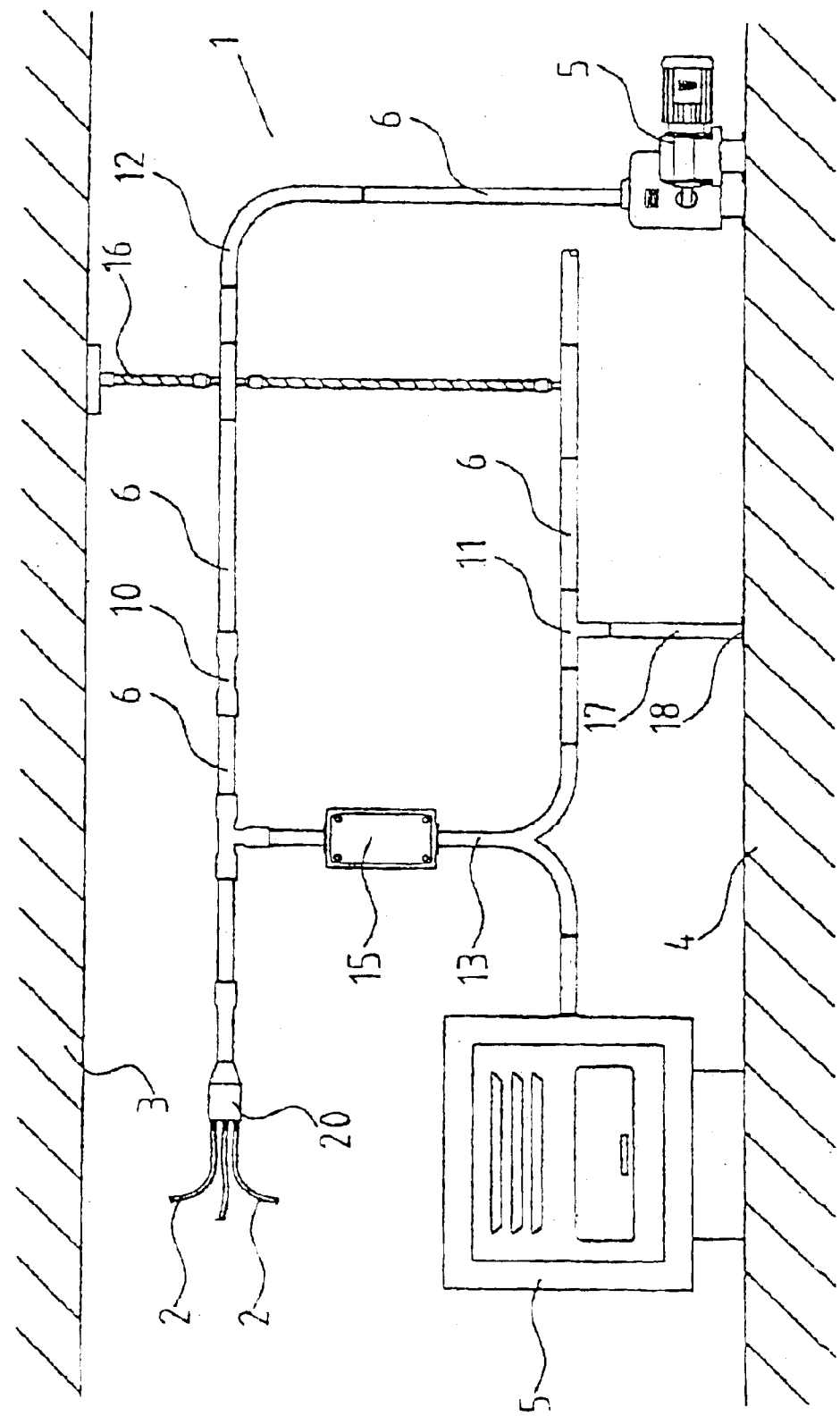
FIG. 1 is a typical layout of a steel trunking assembly for housing power transmission cable.

Referring to the drawings and initially to FIG. 1, there is illustrated portion of a factory housing a steel trunking assembly according to the invention, indicated generally by the reference numeral 1, for housing transmission cables 2. Also illustrated is a roof 3 of the building and a floor 4 on which is mounted machinery 5. Straight lengths of conduit 6 are illustrated connected by various connectors in various forms such as a straight connector 10, a T-piece connector 11, a right angle bend connector 12 and a seagull connector 13. All the connectors 10 to 13 inclusive, are of essentially the same construction, although they may have a different number of outlets and they may be of a different shape. Also illustrated is an inspection box 15, hangers 16 and support 17 mounted on foot plates 18. The support 17 is also made from conduit and connected to other conduits 6 by a T-piece connector 11. Also illustrated is a transmission cable outlet device 20.

FIG. 2 shows in more detail, the straight connector 10 and the T-piece connector 11.

Figure 3:
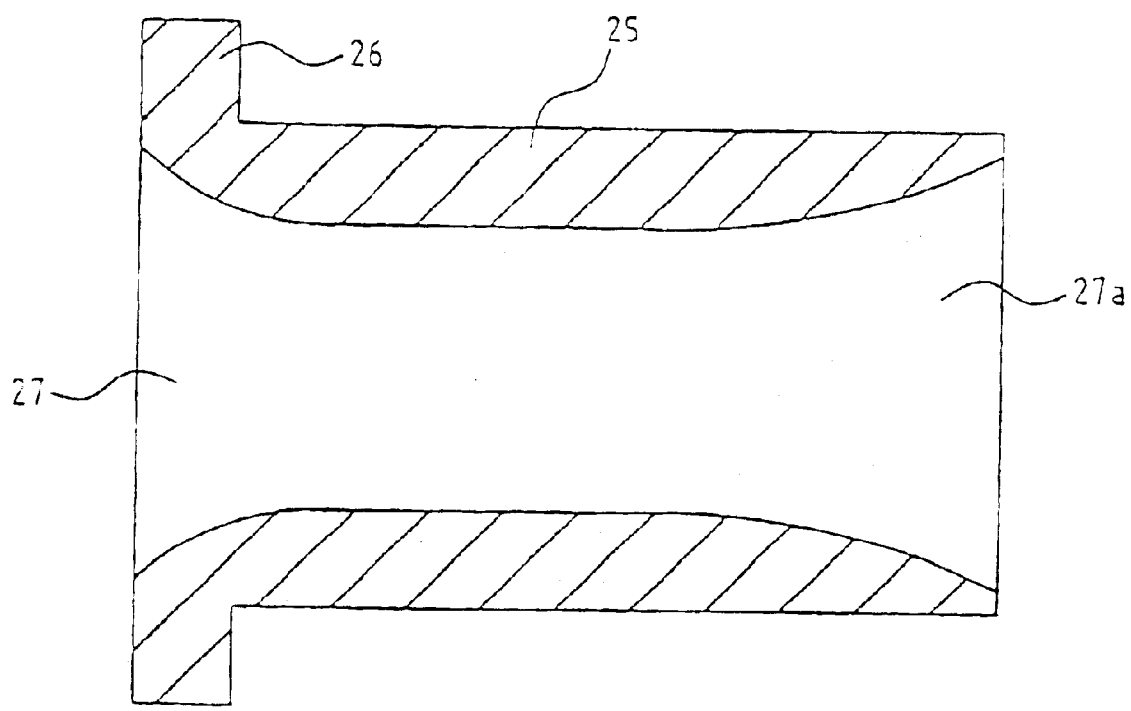
FIG. 3 is a sectional view of a sleeve used in the invention.
Figure 4:
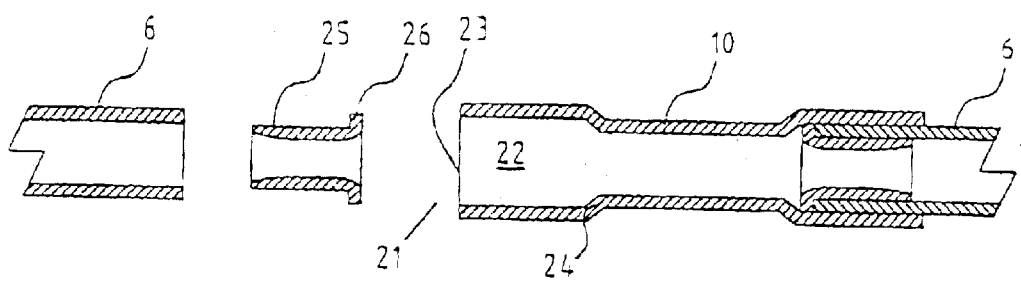
FIG. 4 is a partly exploded sectional view showing a length of conduit connected to a connector according to the invention.

Referring now specifically to FIGS. 3 and 4, there is illustrated a straight connector 10 connecting a pair of conduits 6. Each straight connector 10 comprises two conduit inlets, indicated generally by the reference numeral 21, having a conduit receiving bore 22 extending from an open conduit receiving mouth 23 to an internal conduit restraining stop 24 provided by reducing the bore of the connector 10. A bored sleeve 25 of a plastics material having a flange 26 is mounted on each length of conduit 6. Effectively, the flange 26, as can be seen, provides a stop engaging annular flange. The sleeve 25 has an enlarged tapering bore at 27 to provide a smooth transition between the exterior of the flange 26 and the interior of the sleeve 25 and thus the conduit 6. The sleeve 25 has a further enlarged tapering bore 27(a) to provide a smooth transition at its other end. In use, the sleeve 25 is placed on the conduit 6 and the conduit and sleeve are pushed into the connector 10 until the flange 26 impinges against the stop 24.

Ideally, the conduit 6 is a snug fit within the connector 10 and in some embodiments, the flange 26 may be made slightly oversized, so as to project beyond the exterior of the conduit 6 to cause a better force-fit within the connector 10.

Figure 5:
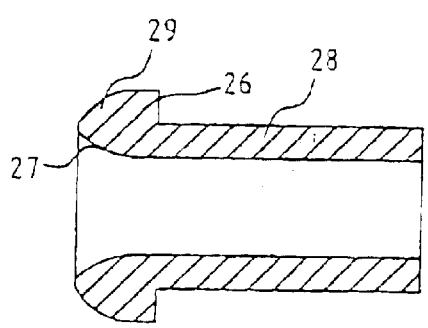
FIG. 5 is a sectional view of an alternative construction of sleeve.
Figure 6:
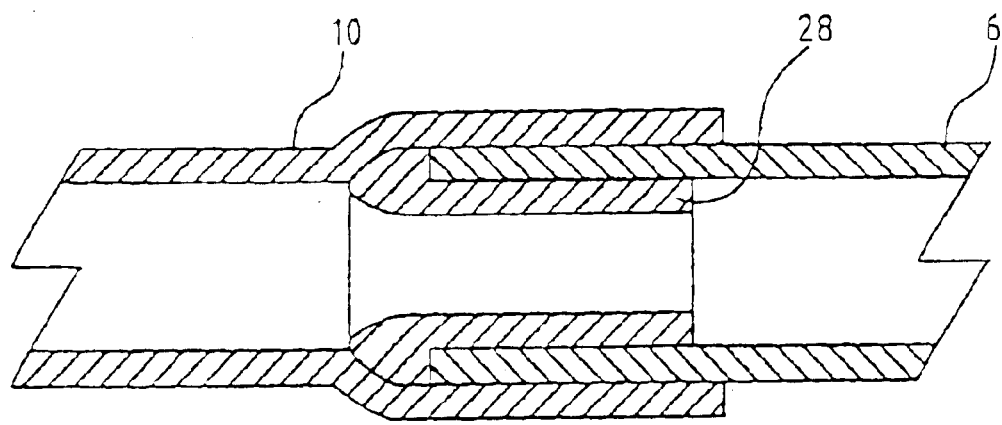
FIG. 6 is a view similar to FIG. 5.

Referring now to FIGS. 5 and 6, there is illustrated a further connector, again identified by the reference numeral 10, in which there is provided a sleeve 28, and parts similar to those described with reference to the previous drawings are identified by the same reference numerals. In this embodiment, the flange 26 has an outer stop facing surface 29 to mirror the shape of the bore of the connector 10 where its diameter is reduced to form the conduit restraining stop 24. If the sleeve is of a resilient material, it will be appreciated that it will bed securely within the connector 10.

Referring now to FIGS. 7 and 8, there is shown in more detail, the transmission cable outlet device 20 which comprises an integral conduit connector, indicated generally by the reference numeral 30, which conduit connector 30 is identical in construction to, for example, half the connector 10 as illustrated in the previous drawings. Thus, it can be connected to a conduit 6 in the same way as has already been described with reference to the previous drawings. The transmission cable outlet device 20 comprises a hollow body member 60 formed from an enlarged portion 31 connected by a frusto-conical portion 32 to the conduit connector 30. The enlarged portion 31 terminates in an end plate 33. The end plate 33 mounts, in holes only one of which, 39, is shown, a number of glands 34 which comprise a cable housing tube 35 having a threaded nozzle 36 terminating in a split nose 37 which is tightened against a transmission cable by a threaded bored cap 38.

Figure 9:
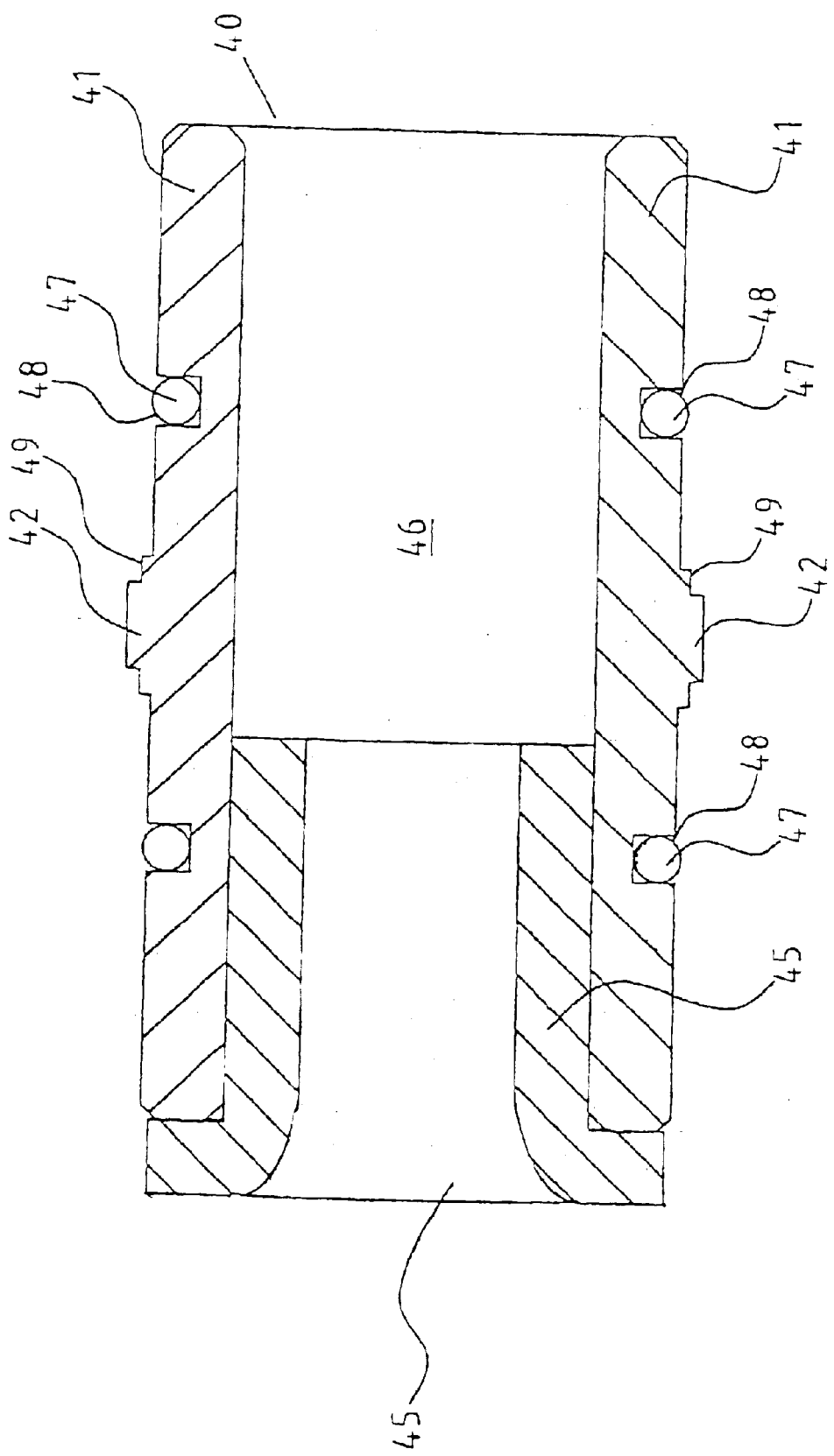
FIG. 9 is a sectional view of another connector according to the invention.
Figure 10:
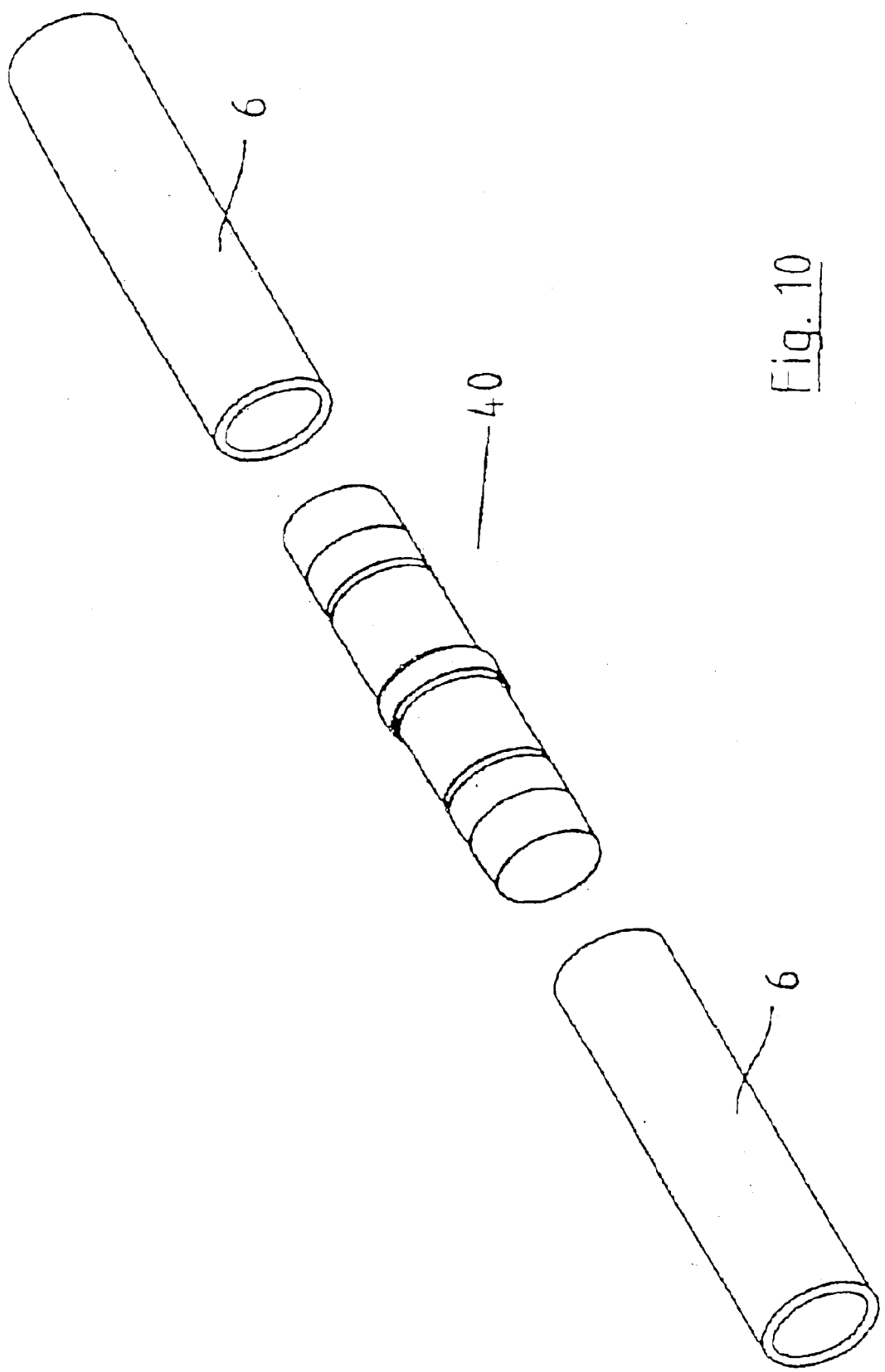
FIG. 10 is an exploded view of conduits and connectors similar to those illustrated in FIG. 9.

Referring to FIGS. 9 and 10, there is illustrated portion of another connector, indicated generally by the reference numeral 40, for connecting two conduits 6 together. The connector 40 comprises two cylindrical connector spigots 41 for engagement in the free end of a conduit 6. Each connector spigot 41 has a conduit restraining stop, in this case, the same conduit restraining stop formed by an annular rim 42. Sleeves 45, only one of which is shown, are mounted within the bore 46 of the connector 40. The sleeve 45 is of substantially the same construction as the sleeves described above, although in this particular embodiment, it has a slightly different shape to facilitate mating and a smooth transition between the connector 40 and a conduit 6. Each of the spigots 41 forming the connector 40 mounts an O-ring 47 in an annular groove 48. The exterior of the spigot at 49 adjacent the rim 42 is of an enlarged diameter to form a force-fit with the conduit. The actual enlargement in the diameter has been exaggerated in the drawings as it will be appreciated that, in practice, it would be much smaller than this.

In use, the connector 40 is inserted into a conduit 6 rather than as in the previous embodiments, however, again the sleeve 45 is used to provide a good transition for cable and prevent damage of cable. Further, the sleeve 45 may be used to provide a further force-fit as will the O-rings 47.

It will be appreciated that constructions of the connector similar to those described above can be used with any T-piece or indeed with any piece of equipment. One of the great advantages of the present invention is that since the conduits are manufactured from steel, there will be a good earth provided.

Many other constructions may be used, for example, the sleeve of the transition cable outlet device could be threaded to, for example, internally threaded outlet connectors.

On the face of it, this is a relatively simple invention. However, the use of the connectors according to the present invention is surprisingly advantageous by virtue of this simplicity. Conduit can be cut and adapted in situ, which conduit can be relatively easily connected to other lengths of conduit. The idea of using the resilient sleeve is particularly advantageous. It does not only make the connection between the conduit and the connector secure and tight but it additionally provides a very soft and smooth surface for housing hose lines, electric cable and the like, within the conduit.

In the specification the terms "comprise, comprises, comprised and comprising" or any variation thereof and the terms "include, includes, included and including" or any variation thereof are considered to be totally interchangeable and they should all be afforded the widest possible interpretation.

The invention is not limited to the embodiments hereinbefore described but may be varied in both construction and detail within the scope of the claims.

What is claimed is:

1. A steel trunking assembly for housing transmission cables comprising:
    a plurality of lengths of steel conduit circular in cross section having exposed and faces;
    conduit connectors for securing the lengths of conduit together, each of said connectors comprising:
    at least two cylindrical connector spigots, said at least two cylindrical connector spigots for engagement in the free end of a conduit;
    one of said at least two cylindrical connector spigots having on its outer surface a conduit restraining stop, and in which the external shape of one of said at least two cylindrical connector spigots is such as to provide a snug fit of one of said at least two cylindrical connector spigots within the conduit bore;
    a bored sleeve of a plastics material forming a force-fit within one of said at least two cylindrical connector spigots, the sleeve having an annular flange projecting across the exposed end face of one of said at least two cylindrical connector spigots; and
    a transmission cable outlet device for the trunking comprising:
        a hollow body member;
        an endplate incorporating a plurality of exit holes; and
        a gland in each exit hole.

2. The assembly as claimed in claim 1, in which the hollow body member comprises:
    an integral conduit connector for securing to a length of conduit; and
    an enlarged portion terminating in the end plate.

3. The assembly as claimed in claim 1, in which the annular flange extends laterally beyond the exterior of one of said at least two cylindrical connector spigots to form a force-fit for one of said at least two cylindrical connector spigots in the conduit.

4. The assembly as claimed in claim 3, in which the bored sleeve is of a resilient plastics material.

5. The assembly as claimed in claim 3, in which the conduit restraining stop comprises an annular rim for engagement with the exposed end face of the conduit.

6. The assembly as claimed in claim 5, in which one of said at least two cylindrical connector spigots mounts an O-ring in an annular groove on its exterior for engagement with the conduit.

7. The assembly as claimed in claimed in claim 3, in which the exterior of one of said at least two cylindrical connector spigots adjacent the annular rim is of an enlarged diameter to form a force-fit with the conduit.

8. The assembly as claimed in claim 7, in which one of said at least two cylindrical connector spigots mounts an O-ring in an annular groove on its exterior for engagement with the conduit.

9. The assembly as claimed in claim 3, in which one of said at least two cylindrical connector spigots mounts an O-ring in an annular groove on its exterior for engagement with the conduit and in which the exterior of one of said at least two cylindrical connector spigots adjacent the annular rim is of an enlarged diameter to form a force-fit with the conduit.

10. a steel trunking assembly for housing transmission cable comprising:
    a plurality of lengths of steel conduit circular in cross section having exposed end faces;
    conduit connectors for securing the lengths of conduit together, each of said connectors comprising:
    at least two cylindrical connector spigots, said at least two cylindrical connector spigots for engagement in the free end of a conduit;
    one of said at least two cylindrical connector spigots having on its outer surface a conduit restraining stop, and in which the external shape of one of said at least two cylindrical connector spigots is such as to provide a snug fit of one of said at least two cylindrical connector spigots within the conduit bore; and
    a bored sleeve of a plastics material forming a force-fit within one of said at least two cylindrical connector spigots, the sleeve having an annular flange projecting across the exposed end face of one of said at least two cylindrical connector spigots.

11. The assembly as claimed in claim 10, in which the annular flange extends laterally beyond the exterior of one of said at least two cylindrical connector spigots to form a force-fit for one of said at least two cylindrical connector spigots in the conduit.

12. The assembly as claimed in claim 11, in which the bored sleeve is of a resilient plastics material.

13. The assembly as claimed in claim 11, in which the conduit restraining stop comprises an annular rim for engagement with the exposed end face of the conduit.

14. The assembly as claimed in claim 13, in which one of said at least two cylindrical connector spigots mounts an O-ring in an annular groove on its exterior for engagement with the conduit.

15. The assembly as claimed in claim 11, in which one of said at least two cylindrical connector spigots mounts an O-ring in an annular groove on its exterior for engagement with the conduit.

16. The assembly as claimed in claim 11, in which the exterior of one of said at least two cylindrical connector spigots adjacent the rim is of an enlarged diameter to form a force-fit with the conduit.

17. The assembly as claimed in claim 16, in which one of said at least two cylindrical connector spigots mounts an O-ring in an annular groove on its exterior for engagement with the conduit.

18. The assembly as claimed in claim 11, in which one of said at least two cylindrical connector spigots mounts an O-ring in an annular groove on its exterior for engagement with the conduit and in which the exterior of one of said at least two cylindrical connector spigots adjacent the rim is of an enlarged diameter to form a force-fit with the conduit.

19. The assembly as claimed in claim 10, in which the conduit restraining stop comprises an annular rim for engagement with the exposed end face of the conduit.

20. The assembly as claimed in claim 19, in which one of said at least two cylindrical connector spigots mounts an O-ring in an annular groove on its exterior for engagement with the conduit.

21. The assembly as claimed in claim 19, in which the exterior of one of said at least two cylindrical connector spigots adjacent the annular rim is of an enlarged diameter to form a force-fit with the conduit.

22. The assembly as claimed in claim 19, in which one of said at least two cylindrical connector spigots mounts an O-ring in an annular groove on its exterior for engagement with the conduit and in which the exterior of one of said at least two cylindrical connector spigots adjacent the annular rim is of an enlarged diameter to form a force-fit with the conduit.

23. The assembly as claimed in claim 19, in which the sleeve is of a resilient plastics material and in which the flange extends laterally beyond the exterior of one of said at least two cylindrical connector spigots to form a force-fit for one of said at least two cylindrical spigots in the conduit.

24. The assembly as claimed in claim 23, in which the exterior of one of said at least two cylindrical connector spigots adjacent the annular rim is of an enlarged diameter to form a force-fit with the conduit.

25. The assembly as claimed in claim 10, in which the sleeve is of a resilient plastics material.

26. The assembly as claimed in claim 10, in which one of said at least two cylindrical connector spigots mounts an O-ring in an annular groove on its exterior for engagement with the conduit.

27. The assembly as claimed in claim 10, in which the exterior of one of said at least two cylindrical connector spigots adjacent the annular rim is of an enlarged diameter to form a force-fit with the conduit.

28. The assembly as claimed in claim 10, in which one of said at least two cylindrical connector spigots mounts an O-ring in an annular groove on its exterior for engagement with the conduit and in which the exterior of one of said at least two cylindrical connector spigots adjacent the rim is of an enlarged diameter to form a force-fit with the conduit.

* * * * *